United States Patent
Chevreau et al.

(10) Patent No.: US 7,832,002 B2
(45) Date of Patent: Nov. 9, 2010

(54) SECURE ELECTRIC ANTI-THEFT DEVICE, ANTI-THEFT SYSTEM COMPRISING ONE SUCH ELECTRIC DEVICE AND METHOD OF MATCHING ELECTRIC DEVICES

(75) Inventors: Sylvain Chevreau, Rennes (FR); Eric Diehl, Liffre (FR); Teddy Furon, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 945 days.

(21) Appl. No.: 10/524,654

(22) PCT Filed: Aug. 21, 2003

(86) PCT No.: PCT/EP03/50386

§ 371 (c)(1),
(2), (4) Date: Oct. 25, 2005

(87) PCT Pub. No.: WO2004/019296

PCT Pub. Date: Mar. 4, 2004

(65) Prior Publication Data

US 2006/0103531 A1      May 18, 2006

(30) Foreign Application Priority Data

Aug. 21, 2002   (FR) .................................. 02 10430

(51) Int. Cl.
*G11C 7/00* (2006.01)
(52) U.S. Cl. .............................. 726/17; 726/34; 726/35; 713/189; 713/323
(58) Field of Classification Search ................... 726/17, 726/34–35; 713/189, 323; 714/51
See application file for complete search history.

(56) References Cited

U.S. PATENT DOCUMENTS

| | | | |
|---|---|---|---|
| 6,032,257 A | | 2/2000 | Olarig et al. |
| 6,047,242 A | * | 4/2000 | Benson ........................ 702/35 |
| 6,175,308 B1 | * | 1/2001 | Tallman et al. ......... 340/539.11 |
| 6,697,719 B2 | * | 2/2004 | Stouffer et al. ................ 701/36 |
| 2002/0108058 A1 | * | 8/2002 | Iwamura ...................... 713/201 |

FOREIGN PATENT DOCUMENTS

| | | |
|---|---|---|
| JP | 08-305461 | 11/1996 |
| WO | WO9804967 | 2/1998 |

OTHER PUBLICATIONS

Search Report Dated Dec. 17, 2003.

* cited by examiner

*Primary Examiner*—Thanhnga B Truong
(74) *Attorney, Agent, or Firm*—Robert D. Shedd; Paul P. Kiel

(57) ABSTRACT

The invention particularly relates to an electrical device for connection to a predetermined network containing at least one watchdog device. The electrical device comprises configuration means for authorizing its operation in the presence of said watchdog device, where these configuration means are based on the recording of a watchdog device public identifier in storage means of the electrical device; means for identifying at least one watchdog device when the electrical device is connected to any network containing such a watchdog device, and means for disabling the electrical device if the watchdog device identified does not correspond to the watchdog device for which it was configured or if said network does not contain a watchdog device. The invention also concerns an anti-theft system and a method for pairing devices.

17 Claims, 2 Drawing Sheets

SECURE ELECTRIC ANTI-THEFT DEVICE, ANTI-THEFT SYSTEM COMPRISING ONE SUCH ELECTRIC DEVICE AND METHOD OF MATCHING ELECTRIC DEVICES

This application claims the benefit, under 35 U.S.C. §365 of International Application PCT/EP03/50386, filed Aug. 21, 2003, which was published in accordance with PCT Article 21(2) on Mar. 4, 2004 in French and which claims the benefit of French patent application No. 0210430, filed Aug. 21, 2002.

FIELD OF THE INVENTION

The present invention relates to an electrical device intended for connection to a network containing at least one watchdog device. It also relates to an antitheft system containing a network to which a watchdog device is connected. Finally, it relates to a method of pairing a first and a second device, the first device being called the watchdog device.

PRIOR ART

The prior art already divulges such an electrical device intended for connection to a network containing a watchdog device. The latter is configured so as to prevent the operation of the electrical device in the event of theft.

For example, in document WO 98/04967, an electrical device featuring a protective system can only operate if it is connected to a watchdog device authorising its operation. The watchdog device manages, in an associated database, a list of electrical devices identified by a unique identification code and contains operation authorisation means for the devices recorded in the list. In general, the watchdog device is fixed, hidden, or even in a remote position so that thieves can only steal the electrical devices connected to this watchdog device. Consequently, the thieves do not possess the watchdog device that enables the stolen apparatus to work and cannot use or resell these devices.

The disadvantage of such a system is that the watchdog device controls the authorisation for the electrical device to operate. Moreover, the watchdog device controls the authorization for the operation of all the other devices on the list. This system of control can become cumbersome and difficult where many electrical devices are connected to the watchdog device.

SUMMARY OF THE INVENTION

The invention aims to overcome this disadvantage by supplying an electrical device that can be protected against theft without requiring the management of a list of electrical devices by the watchdog device to which it is associated.

To this effect, the subject of the invention is an electrical device intended for connection to a network containing at least one watchdog device. The electrical device contains storage means; configuration means for authorizing its operation in the presence of said watchdog device, means for identifying at least one watchdog device when the electrical device is connected to any network comprising such a watchdog device, and means for disabling the electrical device if the watchdog device identified does not correspond to the watchdog device for which it was configured or if said network does not contain a watchdog device. The configuration means of the electrical device are adapted for the recording of a public identifier of the watchdog device for which the electrical device is configured, in the storage means of the latter.

Further, an electrical device according to the invention can feature one or more of the following characteristics:
the identification means contains means for interrogating any watchdog device to determine its public identifier;
the identification means contains means for authenticating the watchdog device for which it was configured;
the authentication means implement a zero-knowledge challenge/response protocol;
the electrical device is in a state chosen from one of the elements of the assembly comprising a virgin state, a configured state for operating in the presence of at least one watchdog device and a blocked state, the configured state being obtained after activation of the configuration means and the blocked state being obtained after activation of the disabling means; and
the electrical device operates only when it is in the configured state.

The invention also relates to an antitheft system comprising at least one network and at least one watchdog device connected to the network and containing a public identifier, characterized in that it contains at least one electrical device as described earlier.

Moreover, an antitheft system according to the invention can feature one or more of the following characteristics:
the watchdog device contains secure storage means for a secret identifier from which the public identifier is generated; and
the network is chosen from among one of the elements of the assembly made up of an electrical network, a digital transmission network and a telecommunications network.

Finally, the object of the invention is a method for pairing a first and second device, where the second device is designed for connection to a network that is connected to the first "watchdog device". The method comprises a step of configuration of the second device to authorize its operation only in the presence of the watchdog device. This second device configuration step involves recording a watchdog device public identifier in storage means of the second device.

Moreover, a pairing method according to the invention can feature one or more of the following characteristics:
the second device is in a state selected from one of the elements of the assembly comprising a virgin state, a configured state for operating in the presence of at least one watchdog device and a blocked state and in that the configuration step comprises a change in state of the second device, from the virgin state to the configured state;
the method comprises a step of disabling the second device when this device is connected to a watchdog device for which it was not configured, where this disabling step comprises a change of state of the second device from the configured state to the blocked state;
the method comprises a step of identifying a watchdog device connected to a network, when the second device is connected to this network;
the identification step is triggered by one of the triggering events from the set of events constituted by: a connection of the second device to the network, a start up of the second device and a regular or random identification program;
the identification step comprises the authentication of the watchdog device;
the authentication is realised by using a zero-knowledge challenge/response protocol;
as the watchdog device comprises means for secure storage of a secret identifier from which a public identifier is generated, the identification comprises a step of interrogating the watchdog device to determine its public identifier and the authentication comprises a series of steps during which the watchdog device proves to the electrical device that it knows the secret identifier by using the zero-knowledge challenge/response protocol; and if the identification step concludes that the watchdog device for which the second device was configured is present on the watchdog network, while the second device is in the blocked state, there follows a change in state of the second device from the blocked state to the configured state.

BRIEF DESCRIPTION OF THE DRAWINGS

The invention will be better understood from the following description, provided for information only and referring to the annexed drawings on which.

DETAILED DESCRIPTION OF AN EMBODIMENT OF THE INVENTION

Figure 1:
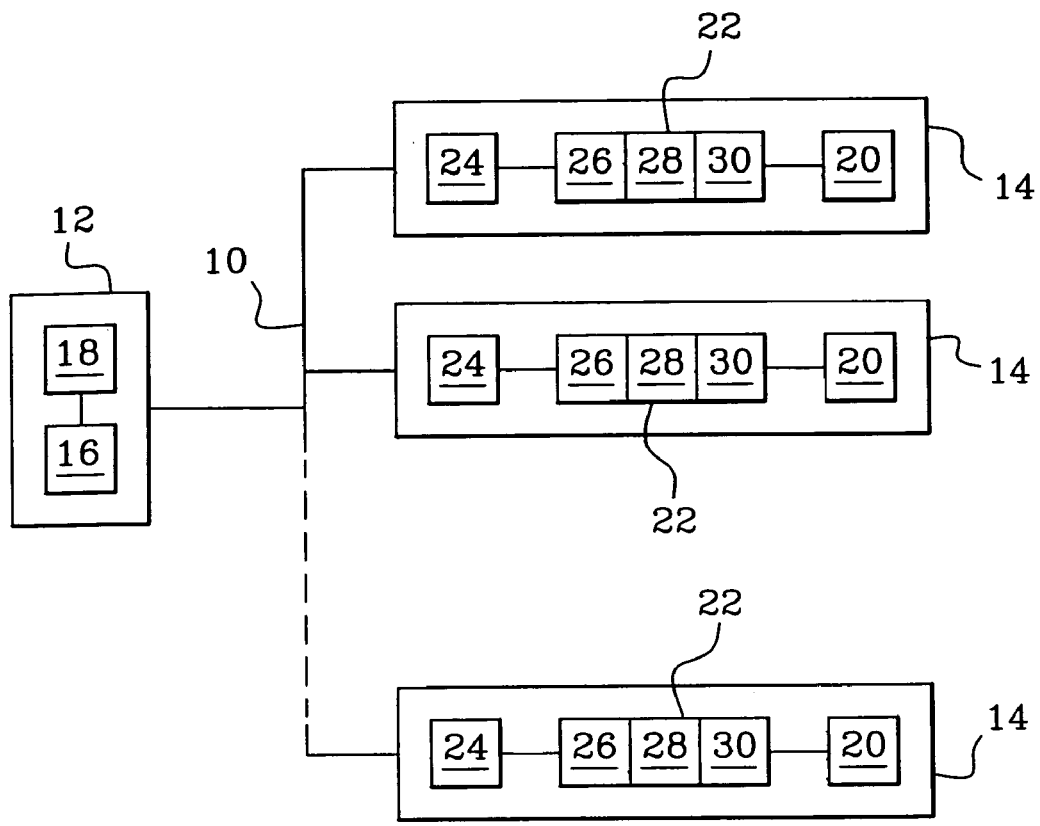
FIG. 1 schematically represents an antitheft system according to the invention.

FIG. 1 shows a local network 10 such as an electrical power supply network, a digital transmission network or even a telecommunications network. This may be a cabled or wireless network. A watchdog device 12 and electrical devices 14 are connected to this local network 10.

The watchdog device 12 can be hidden or fixed to a support so that it is difficult to steal. It includes calculation means 16 such as a secure processor and a network interface 18. The watchdog device 12 stores (not shown in the drawing) a very large secret number S and a number V, hereafter called the public identifier of the watchdog device 12, in memory. S and V verify the following equation:

$$S=\sqrt{V} \bmod n,$$

where n is an integer with a secret factorization, for instance by being the product of two very large prime numbers held secret.

It is easy to verify that if $S=\sqrt{V}$ mod n therefore $S^2=V$ mod n.

The watchdog device 12 also stores a signature SigV of the public identifier V calculated by a control authority, using a public key K.

V and n are public values, namely, known by the watchdog device 12, but which can also be communicated to the electrical devices 14. Whereas the value n is stored in the electrical devices 14 upon construction, the value V is transmitted to the electrical devices 14 during their configuration.

The electrical devices 14 are, for instance, household appliances, audiovisual devices, computers or any other device that is required to be protected against theft and suitable for being connected to network 10. Each electrical device 14 comprises storage means 20, such as a nonvolatile memory, computation means 22 such as a processor and a network interface 24 similar to the network interface 18 of the watchdog device 12.

The computation means 22 comprises means 26 for configuring each electrical device 14, means 28 for identifying watchdog devices and means 30 for disabling each electrical device 14. These means 26, 28 and 30 are advantageously software means programmed in a traditional manner in the processor 22 of each electrical device 14.

Each electrical device 14 stores in its memory 20 the number n and public key K issued by the control authority that computed the signature SigV. This key enables the signature SigV to be verified according to the value of V.

In the embodiment represented, the invention aims to restrict the use of each device 14 to the local network 10, i.e. each electrical device 14 can only operate if it is connected to the watchdog device 12. In this case, the memory 20 of each device 14 stores only the public identifier V of the watchdog device 12, in addition to n and K.

Figure 2:
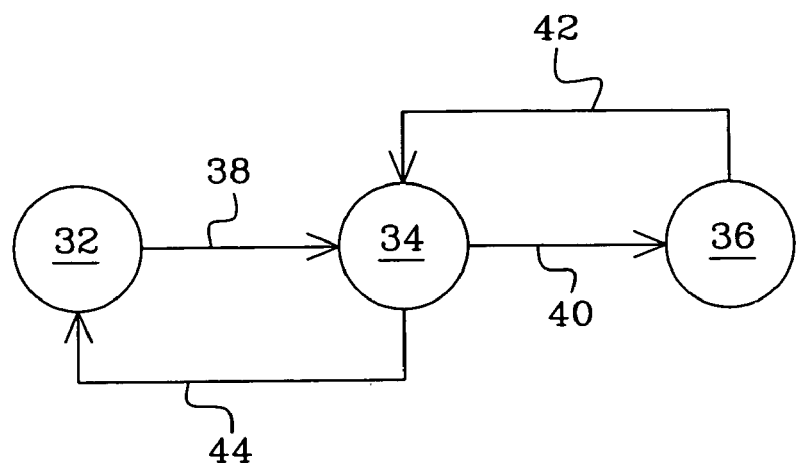
FIG. 2 shows the functional diagram of a change of state method for an electrical device according to the invention.

In another embodiment, the use of each electrical device 14 can be limited to several local networks, each with a watchdog device. Each electrical device 14 can therefore be associated with several watchdog devices. In this case, the memory 20 of each device 14 stores the public identifier V of each watchdog device to which it is associated., The electrical device 14 can be in three basic states, shown in FIG. 2: virgin state 32, configured state 34 and blocked state 36.

The virgin state 32 corresponds to a state in which the memory 20 of electrical device 14 stores no watchdog device public identifier.

The configured state 34 corresponds to a state in which the electrical device 14 stores the public identifier V of the watchdog device 12 in its memory 20. The electrical device 14 can then only operate in the presence of the watchdog device 12, namely when the device 14 is connected to a network to which the watchdog device 12 is also connected.

In another embodiment, the configured state corresponds to a state in which the memory 20 of each device 14 stores the public identifiers V of several predetermined watchdog devices. The electrical device 14 can then operate if it is connected to one of the watchdog devices for which it contains the public identifier V.

The blocked state 36 corresponds to a state in which the electrical device, although configured, cannot operate as it is connected to a watchdog device for which it was not configured, namely for which it has no public identifier V, or else it is not connected to any watchdog device.

In the rest of the document, the state of electrical device 14 is defined by a variable e, stored in its memory 20, which is allocated the value 0 if the electrical device 14 is in the virgin state 32, value 1 if it is in the configured state 34 and value 2 if it is in the blocked state 36.

It is possible to pass from the virgin state 32 to the configured state 34 by a configuration step 38 during which the public identifier V of the watchdog device 12 is recorded in the memory 20 of the electrical device 14 so that the electrical device 14 identifies the watchdog device 12 and can operate in its presence.

In the embodiment described, the configuration step 38 is automatic, for example during the connection of the electrical device 14 to the network 10, or when starting up the electrical device 14 for the first time.

As a variant, the configuration step 38 can be triggered manually by the user, for example through the input of a secret code, the use of a physical or electronic key, or user authentication by biometric means such as the recognition of digital or voice fingerprints.

The configured state 34 goes to the blocked state via an automatic disabling step 40 triggered when the electrical device 14 is connected to a watchdog device other than the watchdog device 12 for which it is configured, namely a watchdog device whose public identifier V is not stored in the memory 20 of the electrical device 14, or when it is not connected to any watchdog device.

The blocked state 36 goes to the configured state 34 via an automatic unblocking step 42. This step is triggered when the blocked electrical device 14 is again connected to the watchdog device 12 for which it contains the public identifier V. The electrical device 14 is then found in the configured state 34, after the implementation of a test of the zero-knowledge challenge/response type that is described hereafter, in reference to FIG. 3.

As a variant, the unblocking step 42 can be triggered manually, for example, during the entry of a password, during the use of a physical or electronic key or during the authentication of the user by biometric means.

Finally, the configured state 34 goes to the virgin state 32 via a reset step 44 during which an authorized user erases all the watchdog device public identifiers stored in the memory 20 of the electrical device 14.

Figure 3:
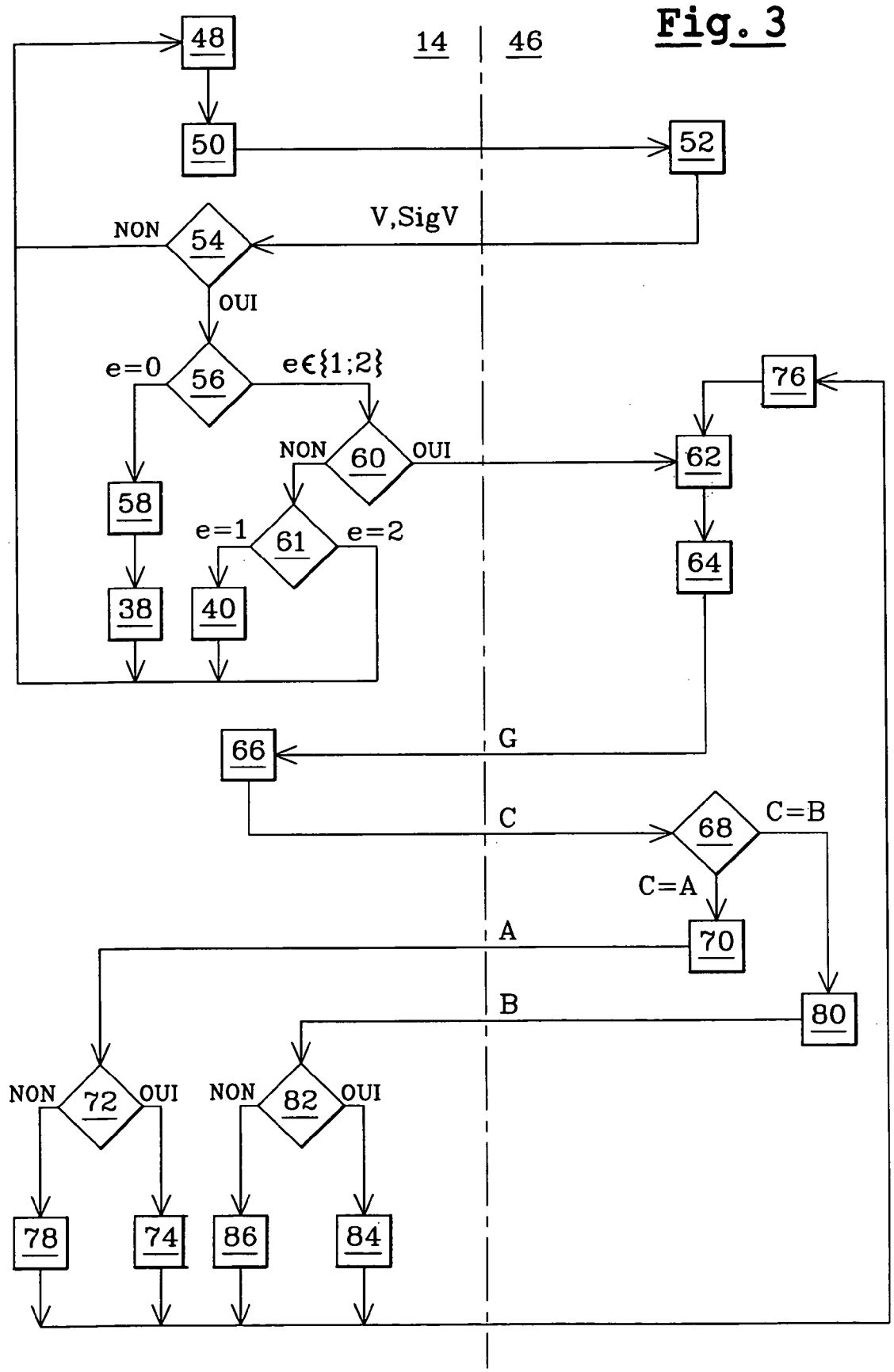
FIG. 3 represents the functional diagram of a method for pairing an electrical device to a watchdog device according to the invention.

The method for pairing the electrical device 14 to any type of watchdog device 46 is described in the functional diagram of FIG. 3.

This pairing method comprises a first initialization step 48 formed by a triggering event such as the start-up of the electrical device 14, its connection to a network or a periodic clock synchronization pulse. In any case, it is assumed that the electrical device is connected to a network to which the watchdog device 46 is also connected.

During the next step 50, the electrical device 14 sends a command requesting the watchdog device 46 on the network to identify itself.

Next, during a step 52, the watchdog device 46 sends the electrical device 14 its public identifier V and signature SigV.

After this step 52, the electrical device 14 performs a test 54. This test involves checking the signature SigV using the public identifier V sent by the watchdog device 46 and the public key K stored in the electrical device 14.

If the result of the test 54 is negative, that is if the signature SigV does not correspond to the identifier V sent, the method is deferred to the initialization step 48.

If the result of the test 54 is positive, a test 56 is performed in the variable e stored in memory 20 of the electrical device 14.

If the variable e is worth 0, that is if the electrical device 14 is in the virgin state 32, a step 58 is reached during which the device 14 stores the public identifier V in its memory 20. Step 58 is followed by the configuration step 38 described above. During this step, the variable e takes the value 1 and the electrical device 14 is subsequently in the configured state 34. The procedure is then deferred to the initialization step 48.

If at step 56, the variable e is 1 or 2, a test step 60 is reached during which the electrical device 14 compares the public identifier V sent by the watchdog device 46 to the public identifier $V_0$ stored in its memory 20.

If the result of test 60 is negative, the electrical device 14 performs a test 61 on variable e. If e is 2 and the device is already inhibited, the initialisation step 48 is reached. Otherwise, with e at 1, the disabling step 40 described above is reached. The variable e takes the value 2 during this step, namely, the electrical device 14 is subsequently in the blocked state 36. The procedure is then deferred to the initialization step 48.

If the result of the test 60 is positive, step 62 is reached during which the watchdog 46 triggers a zero-knowledge challenge/response protocol, firstly by generating a random number r. This procedure follows steps 62 to 86.

Following this step 62, step 64 is reached during which the watchdog device 46 chooses a security number G that is a number taken randomly from two numbers $r^2$ and r.S where S is the secret number of the watchdog device 46. It sends this security number G to the electrical device 14 without informing it of its choice.

During the next step 66, the electrical device 14 randomly allocates a value A or B to a challenge C. It then sends this challenge C to the watchdog device 46.

Following step 66, the watchdog device 46 performs a test 68 on challenge C.

If the test 68 shows that challenge C is A, step 70 is reached during which the watchdog device 46 allocates the value $r^2$ to A and sends back A to the electrical device 14.

Following this step 70, the electrical device 14 performs a test 72 to check the value of the security number G.

It is known that, following step 64, the security number G is $r^2$ or r.S. Since A=$r^2$, there are two possibilities: either G=A (where G=$r^2$); or $r^2.S^2$=A.V mod n (where G=rS). Indeed, in the latter case, if the public identifier V corresponds to the watchdog device 46, namely, if $S^2$=V mod n, then $r^2.S^2$=A.V mod n. So if V is indeed the identifier of the watchdog device 46, G=A or $G^2$=A.V mod n.

If the test 72 is positive, that is if G=A or if $G^2$=A.V mod n, a step 74 is reached during which the value 1 is given to e, that is, the electrical device is set to the configured state 34.

Following this step 74, a triggering event monitoring step 76 is reached. During this step 76, as soon as a triggering event belonging to a set of predetermined triggering events is detected, step 62 is reached. These triggering events are the same, for instance, as those of step 48.

If the test 72 is negative, that is if G≠A or if $G^2$≠A.V mod n, a step 78 is reached during which the value 2 is given to e, that is, the electrical device is set to the blocked state 36.

Following this step 78, a triggering event monitoring step 76 is reached.

If the test 68 shows that challenge C is B, a step 80 is reached during which the watchdog device 46 allocates the value r.S to B and sends B to the electrical device 14.

Following this step 80, the electrical device 14 performs a test 82 to check the value of the security number G.

It is known that, following step 64, the security number G is $r^2$ or r.S. Since B=r.S, there are two possibilities: either G=B (where G=rS), or $r^2.S^2$=G.V mod n (where G=$r^2$). Indeed, in the latter case, if the public identifier V corresponds to the watchdog device 46, namely, if $S^2$=V mod n, then $r^2.S^2$=G.V mod n. So if V is indeed the identifier of the watchdog device 46, G=B or $B^2$=G.V mod n.

If the test 82 is positive, that is if G=B or if $B^2$=G.V mod n, a step 84 is reached during which the value 1 is given to e, that is, the electrical device is set to the configured state 34.

Following this step 84, a triggering event monitoring step 76 is reached.

If test 82 is negative, that is if G≠B or if $B^2$≠G.V mod n, step 86 is reached during which the value 2 is given to e, namely, the electrical device is set to the blocked state 36.

Following this step 78, a triggering event monitoring step 76 is reached.

Among the advantages of this invention, it should be noted that it enables each electrical device to operate only in the presence of the watchdog device for which it was configured, without requiring the watchdog to manage a list of authorized devices.

It should also be noted that the invention allows an automatic antitheft test, without requiring the intervention of any central authority.

Finally, no secret information is stored in the electrical devices 14 owing to the use of a zero-knowledge challenge/response protocol for authentication.

The invention claimed is:

1. Electrical device for connection to a predetermined network containing at least one watchdog device, where said electrical device comprises:
   storage means,
   configuration means for authorizing its operation of said electrical device in the presence of said watchdog device,
   means for identifying at least one watchdog device when the electrical device is connected to any network containing such a watchdog device; and
   means for automatically disabling the electrical device if the watchdog device identified does not correspond to the watchdog device for which said electrical device was configured or if said network does not contain a watchdog device, wherein the configuration means are suitable for recording a public identifier of the watchdog device for which the electrical device is configured, in the storage means.

2. Electrical device according to claim 1, wherein the identification means comprise means for interrogating any watchdog device to determine an associated public identifier.

3. Electrical device according to claim 1, wherein the identification means comprise means for authenticating the watchdog device for which the electrical device was configured.

4. Electrical device according to claim 3, wherein the authentication means implement a zero-knowledge challenge/response protocol.

5. Electrical device according to claim 1, wherein said electrical device is in a state chosen from one of the elements of the assembly comprising a virgin state, a configured state for operating in the presence of at least one watchdog device and a blocked state, the configured state being obtained after activation of the configuration means and the blocked state being obtained after activation of the disabling means.

6. Electrical device according to claim 5, wherein said electrical device operates only when said electrical device is in the configured state.

7. Method for connecting an electrical device to a network containing a watchdog device, comprising:
   identifying the presence of the watchdog device when the electrical device is connected to the network;
   configuring operation of the electrical device, wherein operation of the electrical device is authorized only in the presence of the watchdog device, and the configuring operation comprises recording, in a storage means of the electrical device, a public identifier of the watchdog device; and
   automatically disabling the electrical device if the watchdog device identified does not correspond to the watchdog device for which said electrical device was configured or if said network does not contain a watchdog device.

8. Method according to claim 7, wherein the electrical device is in a state selected from among: a virgin state; a state configured to operated in the presence of at least one watchdog device; and a blocked state, and in that the configured step comprises changing from the virgin to the configured state.

9. Method according to claim 8, further comprising a step of disabling the electrical device when the electrical device is connected to a watchdog device for which the electrical device was not configured, where the disabling step comprises changing from the configured state to the blocked state.

10. Method according to claim 7, wherein the identifying step is triggered by one of: a start up of the second device; and a regular or random identification program.

11. Method according to claim 7, wherein the identifying step comprises authenticating the watchdog device.

12. Method according to claim 11, wherein the authenticating step comprises using a zero-knowledge challenge/response protocol.

13. Method according to claim 7, wherein, the watchdog device comprises means for secure storage of a secret identifier from which a public identifier is generated, and the indentifying step comprises a step of interrogating the watchdog device to determine the public identifier of the watchdog device and the authenticating step comprises use of the zero-knowledge challenge/response protocol by the watchdog device to prove that the watchdog device has the secret identifier.

14. Method according to claim 7, wherein if the identifying step concludes that the network contains the watchdog device for which the second device was configured, but the electrical device is in the blocked state, the electrical device changes state from the blocked state to the configured state.

15. Electrical device, comprising:
   a memory storing identifier data associated with an authorized watchdog device;
   a network interface coupling said electrical device to a communications network; and
   a processor coupled to the memory and the network interface, the processor determining whether the authorized watchdog device is connected to the communications network, an authorizing operation of said electrical device if the authorized watchdog device is connected to the communications network, wherein the processor automatically disables the electrical device if the network does not include the authorized watchdog device, or a detected watchdog device does not correspond to the authorized watchdog device.

16. Electrical device according to claim 15, wherein the identifier corresponds to a public identifier of the authorized watchdog device.

17. Electrical device according to claim 15, wherein said electrical device is in a state chosen from one of the elements of the assembly comprising a virgin state, a configured state for operating in the presence of at least one watchdog device and a blocked state, the configured state being obtained after activation of the configuration means and the blocked state being obtained after activation of the disabling means.

* * * * *